United States Patent
Raney et al.

(10) Patent No.: US 10,178,003 B2
(45) Date of Patent: Jan. 8, 2019

(54) INSTANCE BASED MANAGEMENT AND CONTROL FOR VM PLATFORMS IN VIRTUAL PROCESSING ENVIRONMENTS

(71) Applicant: IXIA, Calabasas, CA (US)

(72) Inventors: Kristopher Raney, Austin, TX (US); Matthew R. Bergeron, Thousand Oaks, CA (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 118 days.

(21) Appl. No.: 15/379,966

(22) Filed: Dec. 15, 2016

(65) Prior Publication Data
US 2018/0176106 A1    Jun. 21, 2018

(51) Int. Cl.
G06F 15/173    (2006.01)
H04L 12/26    (2006.01)
H04L 12/46    (2006.01)
H04L 29/06    (2006.01)

(52) U.S. Cl.
CPC ......... *H04L 43/08* (2013.01); *H04L 12/4641* (2013.01); *H04L 43/04* (2013.01); *H04L 43/12* (2013.01); *H04L 67/42* (2013.01)

(58) Field of Classification Search
CPC ...... H04L 43/08; H04L 12/4641; H04L 67/42
See application file for complete search history.

(56) References Cited

U.S. PATENT DOCUMENTS

| 8,656,006 B2 * | 2/2014 | Cobb .................. H04L 67/22 709/224 |
| 9,110,703 B2 | 8/2015 | Santos et al. |
| 9,680,728 B2 | 6/2017 | Besser |
| 2011/0004698 A1 | 1/2011 | Wu |
| 2012/0210318 A1 | 8/2012 | Sanghvi et al. |
| 2013/0031233 A1 | 1/2013 | Feng et al. |
| 2013/0291109 A1 | 10/2013 | Staniford et al. |
| 2014/0229605 A1 | 8/2014 | Besser |
| 2015/0263889 A1 | 9/2015 | Newton |
| 2015/0319030 A1 | 11/2015 | Nachum |

(Continued)

OTHER PUBLICATIONS

International Search Report and Written Opinion, PCT/US2017/063909, dated Mar. 1, 2018, 11 pgs.
(Continued)

*Primary Examiner* — Mohamed A Wasel

(57) ABSTRACT

Metadata associated with client application instances running in virtual machine (VM) platforms within virtual processing environments is collected by monitor applications also running within the VM platforms. The instance metadata is transmitted to and received by a monitor control platform which in turn stores the instance metadata within a monitor instance registry. The instance metadata is updated through solicited or unsolicited updates. The instance metadata is used to identify groups of application instances, and these groups are used to determine targets instances for monitoring or management actions based upon later detected network events such as network security or threat events. Further, trust scores can be determined for components of the metadata stored in the instance registry, and composite trust scores can be generated and used to identify on or more groups of application instances.

28 Claims, 7 Drawing Sheets

(56) References Cited

U.S. PATENT DOCUMENTS

| | | |
|---|---|---|
| 2016/0094418 A1 | 3/2016 | Raney |
| 2016/0094668 A1* | 3/2016 | Chang .................. H04L 67/16 |
| | | 709/223 |
| 2016/0110211 A1 | 4/2016 | Karnes |
| 2016/0269482 A1* | 9/2016 | Jamjoom ............ H04L 67/1095 |
| 2016/0359888 A1 | 12/2016 | Gupta et al. |
| 2017/0099195 A1 | 4/2017 | Raney |
| 2017/0118102 A1 | 4/2017 | Majumder et al. |
| 2017/0163510 A1 | 6/2017 | Arora et al. |

OTHER PUBLICATIONS

Ixia, Ixia xFilter, Data Sheet, 5 pgs. (May 2015).
Ixia, Ixia Phantom vTap With TapFlow Filtering, Data Sheet, 4 pgs. (Jul. 2015).
Ixia, Ixia Hex Tap, Data Sheet, 5 pgs. (Oct. 2015).
Hofstede et al., "How Monitoring Explained: From Packet Capture to Data Analysis With NetFlow and IPFIX", IEEE, 31 pgs. (May 2014).
Commonly-assigned, Co-pending U.S. Appl. No. 15/709,433 for "Methods, Systems and Computer Readable Media for Optimizing Placement of Virtual Network Visibility Components" (Unpublished, filed Sep. 19, 2017).

* cited by examiner

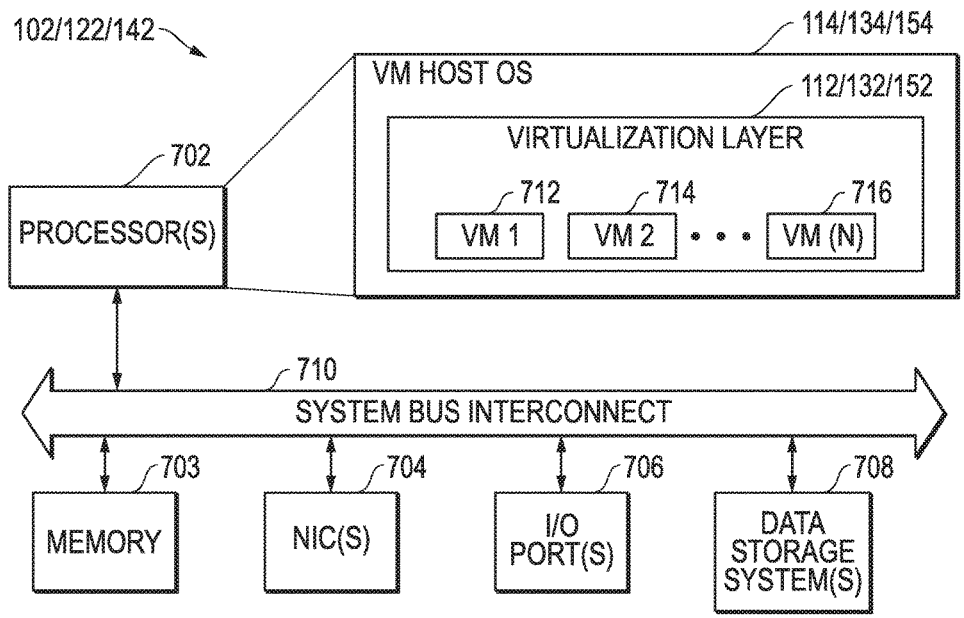
*FIG. 7*
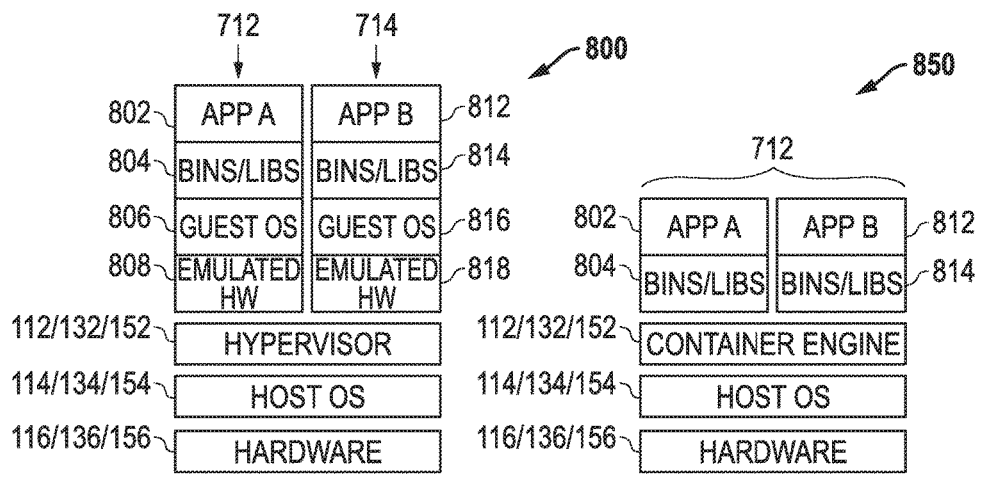
*FIG. 8A*    *FIG. 8B*

INSTANCE BASED MANAGEMENT AND CONTROL FOR VM PLATFORMS IN VIRTUAL PROCESSING ENVIRONMENTS

TECHNICAL FIELD OF THE INVENTION

This invention relates to monitoring packet flows for network communications and, more particularly, to monitoring such packet flows within virtual processing environments.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems.

To help alleviate the problem of limited access to network packets for monitoring, tool aggregation devices or packet broker devices have also been developed that allow shared access to the monitored network packets. In part, these network packet broker devices allow users to obtain packets from one or more network monitoring points (e.g., network hubs, TAPs, SPAN ports, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic of interest to various tools. The traffic of interest can be network packets that are selected by the packet brokers through packet filters and related packet forwarding rules that identify particular packets or packet flows from within the monitored network traffic as traffic of interest.

Network packet analysis tools include a wide variety of devices that analyze packet traffic, including traffic monitoring devices, packet sniffers, data recorders, voice-over-IP monitors, intrusion detection systems, network security systems, application monitors, and/or other network tool devices or systems. Network analysis tools, such as traffic analyzers, are used within packet-based data networks to determine details about the network packet traffic flows within the packet communication network infrastructure.

Certain network communication systems also include virtual processing environments that include virtual machine (VM) platforms hosted by one or more VM host servers. For example, network applications and resources can be made available to network-connected systems as virtualized resources operating within virtualization layers on VM host servers. In some embodiments, processors or other programmable integrated circuits associated with a server processing platform (e.g., server blade) and/or combinations of such server processing platforms operate to provide virtual machine platforms within the server processing platforms. A virtual machine (VM) platform is an emulation of a processing system or network application that is formed and operated within virtualization layer software being executed on a VM host hardware system. By operating multiple VM platforms and/or application instances within such a virtualization layer also operating on VM host hardware system, a variety of processing resources can be provided internally to the virtual processing environment and/or externally to other network-connected processing systems and devices.

When a network to be monitored includes virtual processing environments, however, difficulties arise in determining managing and controlling packet traffic for network communications with VM platforms operating within such virtual processing environments to provide various application resources. For example, web based computing services (e.g., Amazon web services) allow a wide variety of external users to obtain dedicated and elastic processing resources within virtual processing environments running on a large number of interconnected servers. These external users can install, initialize, and operate a wide variety of user application as instances within VM platforms operating within the virtual processing environment. Further, the external users can be corporate or commercial entities that provide multiple different application services to employees and/or end-user consumers of the processing resources. When one or more of these external users desires to monitor, manage, and/or control traffic with respect to their respective VM platforms, difficulties arise in determining and tracking the VM platforms, application instances, and related network traffic.

SUMMARY OF THE INVENTION

Systems and methods are disclosed for instance based management and control for virtual machine (VM) platforms in virtual processing environments. Metadata associated with client application instances running in VM platforms are collected by monitor applications also running within the VM platforms. The instance metadata is transmitted to and received by a monitor control platform which in turn stores the instance metadata within a monitor instance registry. The instance metadata is updated through solicited or unsolicited updates. The instance metadata is used to identify groups of application instances, and these groups are used to determine target instances for monitoring or management actions based upon later detected network events such as network security or threat events. Further, trust scores can be determined for components of the metadata stored in the instance registry, and composite trust scores can be generated and used to identify on or more groups of application instances. Different features and variations can be implemented, as desired, and related systems and methods can be utilized, as well.

For one embodiment, a method is disclosed to control packet traffic monitoring that includes receiving and transmitting network packets with a plurality of virtual machine (VM) platforms operating within one or more VM host servers. Further, at each of the plurality of VM platforms within the one or more VM host servers, the method includes operating one or more client application instances within the VM platform; operating a monitor application within the VM platform; monitoring, with the monitor application, network packets associated with network packet traffic for the one or more client application instances; determining, with the monitor application, metadata associated with the operation of the one or more client application instances; and transmitting, with the monitor application, the metadata to a control server. Still further, at the control server, the method includes receiving metadata from each monitor application within each of the plurality of VM platforms; storing the metadata in records within an instance registry, the instance metadata registry being stored within one or more data storage systems; generating at least one message based upon one or more records within the instance registry, the message indicating one or more actions for at least one target monitor application within at least one target VM platform; and transmitting the at least one message to the at least one target monitor application within the at least one target VM platform. In addition, at the at least one target VM platform, the method includes implementing, with the at least one target monitor application, the one or more actions indicated by the message.

In additional embodiments, the method includes, at the control server, receiving one or more event messages from an external network monitoring tool, searching the instance registry based upon the one or more event messages, and generating the at least one message based upon the results of the searching.

In additional embodiments, the method includes, identifying a plurality of groups based upon the metadata stored within the instance registry. In further embodiments, the at least one message is targeted to one or more of the plurality of groups.

In additional embodiments, the method includes, at the control server, allocating one or more individual trust scores to a plurality of individual components within the records within the instance registry and generating a composite trust score for each record based upon the individual trust scores. In further embodiments, the method includes identifying a plurality of groups based upon the composite trust scores. In still further embodiments, the at least one message is targeted to one or more of the plurality of groups. In further embodiments, the method includes generating the composite trust score based upon a function of two or more of the individual trust scores.

In additional embodiments, the metadata for each client application instance include at least one of an identifier associated with the VM platform, an application identifier associated with the client application instance, or a process identifier (ID) associated a process being run by the client application instance. In further embodiments, the one or more actions include enhanced monitoring of network packet traffic for the at least one target client application instance within the at least one target VM platform. In further embodiments, the one or more actions include termination of the at least one target client application instance within the at least one target VM platform.

In additional embodiments, the method includes, with the monitor application within each of the plurality of VM platforms, automatically sending metadata updates to the control server. In further embodiments, the method includes, with the monitor application within each of the plurality of VM platforms, sending metadata updates to the control server based upon an update message received from the control server.

In additional embodiments, each of the VM platforms operates on a virtualization layer within the one or more VM host servers, and the virtualization layer includes at least one of a hypervisor or a container engine running within the one or more VM host servers.

For one embodiment, a system is disclosed for packet traffic monitoring and control that includes one or more virtual machine (VM) host servers including one or more programmable integrated circuits programmed to host a plurality of VM platforms with each VM platform being configured to run one or more client application instances to send and receive network packet traffic and a monitor application to monitor network packets associated with the network packet traffic for the one or more client application instances, to determine metadata associated with the operation of the one or more client application instances, and to transmit the metadata to a control server. Further, the system includes the control server including one or more programmable integrated circuits programmed to receive the metadata from each monitor application within each of the plurality of VM platforms; store the metadata in records within an instance registry, the instance metadata registry being stored within one or more data storage systems; generate at least one message based upon one or more records within the instance registry, the message indicating one or more actions for at least one target monitor application within at least one target VM platform; and transmit the at least one message to the at least one target monitor application within the at least one target VM platform. In addition, the at least one target monitor application is further configured to implement the one or more actions indicated by the message.

In additional embodiments, the control server is further configured to receive one or more event messages from an external network monitoring tool, to search the instance registry based upon the one or more event messages, and to generate the one or more messages based upon the results of the searching.

In additional embodiments, the control server is further configured to identify a plurality of groups based upon the metadata stored within the instance registry. In further embodiments, the at least one message is targeted to one or more of the plurality of groups.

In additional embodiments, the control server is further configured to allocate one or more individual trust scores to a plurality of individual components within the records within the instance registry and to generate a composite trust score for each record based upon the individual trust scores. In further embodiments, the control server is further configured to identify a plurality of groups based upon the composite trust scores. In still further embodiments, the at least one message is targeted to one or more of the plurality of groups. In further embodiments, the control server is further configured to generate the composite trust score based upon a function of two or more of the individual trust scores.

In additional embodiments, the metadata for each client application instance includes at least one of an identifier associated with the VM platform, an application identifier associated with the client application instance, or a process identifier (ID) associated a process being run by the client application instance. In further embodiments, the one or more actions include enhanced monitoring of network packet traffic for at least one target client application instance within the at least one target VM platform. In further embodiments, the one or more actions include termination of the at least one target client application instance within the at least one target VM platform.

In additional embodiments, the monitor application within each of the plurality of VM platforms is further configured to automatically send metadata updates to the control server. In further embodiments, the monitor application within each of the plurality of VM platforms is further configured to send metadata updates to the control server based upon an update message received from the control server.

In additional embodiments, each of the VM platforms operates on a virtualization layer within the one or more VM host servers, and the virtualization layer includes at least one of a hypervisor or a container engine running within the one or more VM host servers.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 7 is a block diagram of an example embodiment for a VM host server.

FIG. 8A is a block diagram of an example embodiment for a VM host server that uses a hypervisor to provide a virtualization layer.

FIG. 8B is a block diagram of an example embodiment for a VM host server that uses a container engine to provide a virtualization layer.

DETAILED DESCRIPTION OF THE INVENTION

Figure 1:
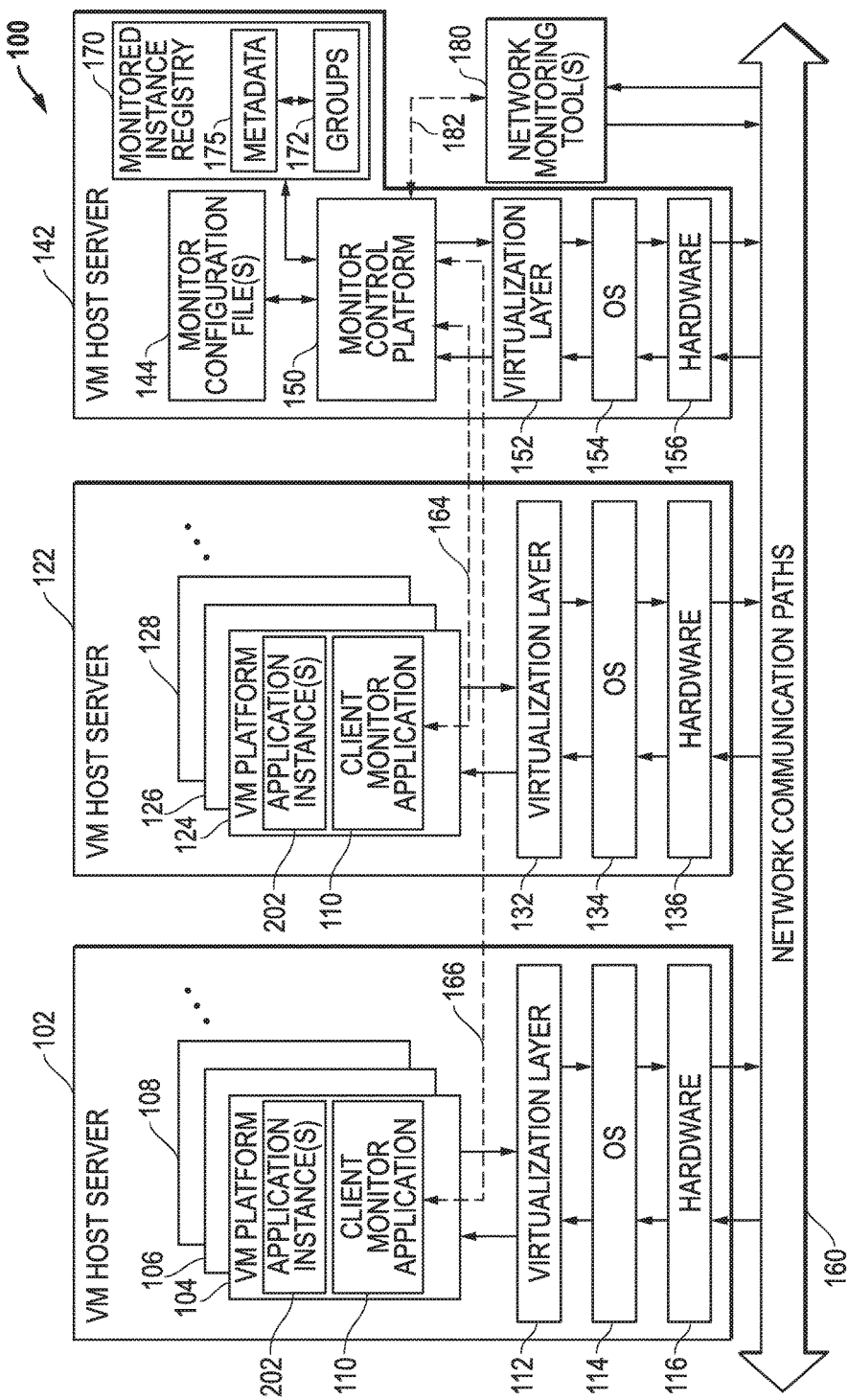
FIG. 1 is a block diagram of an example embodiment for instance based management and control of virtual machine (VM) platforms in virtual processing environments.

Systems and methods are disclosed for instance based management and control for virtual machine (VM) platforms in virtual processing environments. Metadata associated with client application instances running in VM platforms are collected by monitor applications also running within the VM platforms. The instance metadata is transmitted to and received by a monitor control platform which in turn stores the instance metadata within a monitor instance registry. The instance metadata is updated through solicited or unsolicited updates. The instance metadata is used to identify groups of application instances, and these groups are used to determine target instances for monitoring or management actions based upon later detected network events such as network security or threat events. Further, trust scores can be determined for components of the metadata stored in the instance registry, and composite trust scores can be generated and used to identify on or more groups of application instances. Different features and variations can be implemented, as desired, and related systems and methods can be utilized, as well.

As described herein, the disclosed embodiments collect and store metadata associated with monitored application instances operating within virtual processing environments as well as metadata associated with packet flows being handled by these application instances. The metadata is stored, for example, in an instance registry managed by a central monitor control platform, and the instance registry includes searchable data records for the collected metadata. These data records are populated through automated and/or solicited metadata updates from virtual monitor applications running within the virtual machine (VM) platforms operating that in turn are operating within the virtual processing environment. The metadata can include information about the application instances, information about the VM platforms, information about the underlying hardware, information about packets flows being handled by application instances being monitored, information about security levels, information about risk levels, and/or other information associated with the monitored instances. In certain embodiments, security events are received by the monitor control platform and monitoring and/or management actions are taken with respect to the security events. The security events can be, for example, threat intelligence information from other network monitoring functions or devices operating within the network communication system. Further, in certain embodiments, the received security events, threat intelligence information, or other event information is used to analyze instance metadata within the registry, to identify one or more instances, and to take one or more actions with respect to the identified instances. For example, one or more monitoring escalation actions and/or instance management actions can be taken with respect to one or more identified instance. Still further, the metadata within the instance registry can be used to define one or more groups of applications instances, and monitoring actions or management actions can be directed to members of the one or more groups to facilitate management and control of the monitored instances. Trust scores associated with the metadata can also be used to define groups and to take monitoring/management actions. Other variations can also be implemented while still taking advantage of the instance based management and control techniques described herein.

Figure 2:
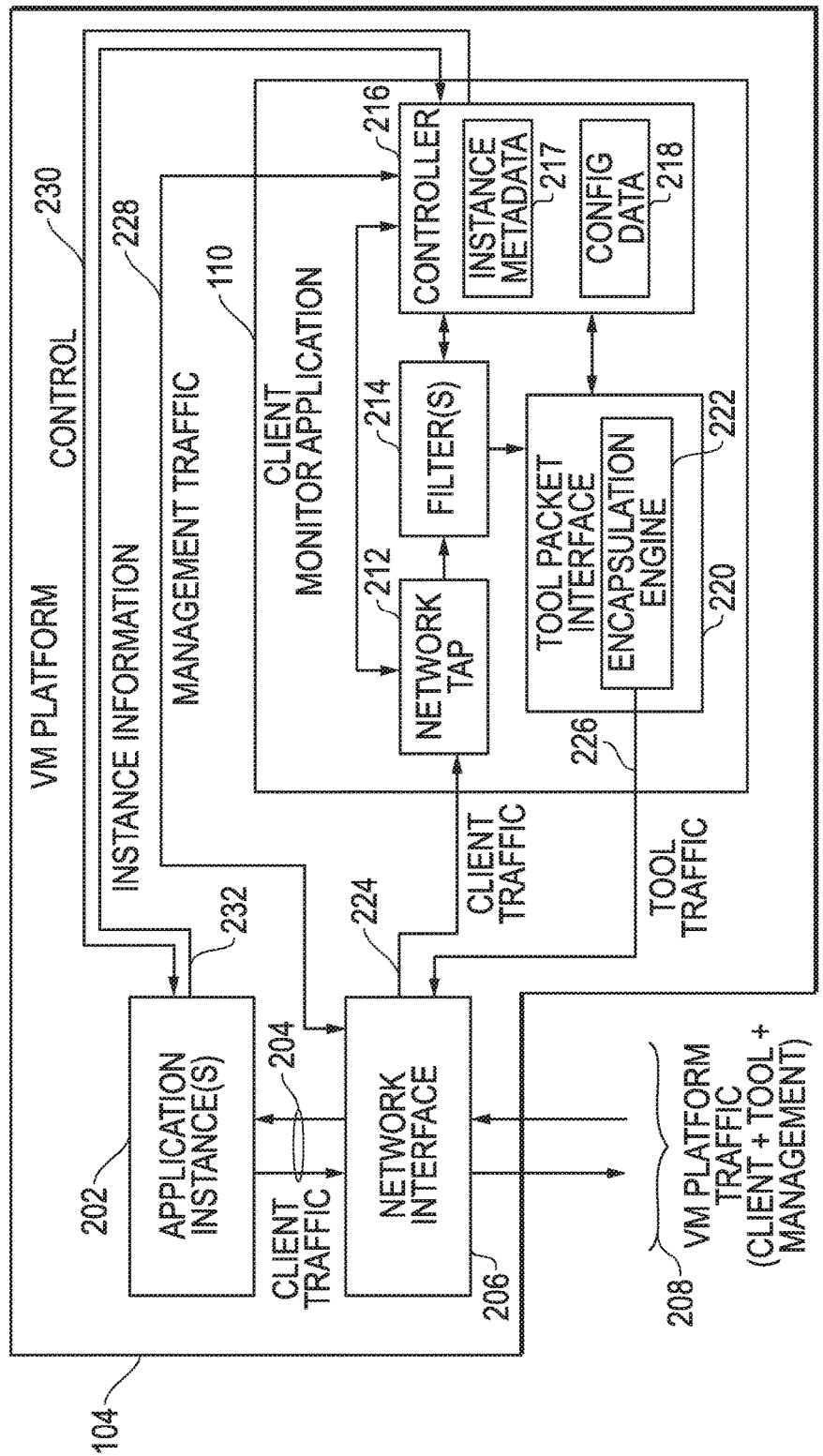
FIG. 2 is a block diagram of an example embodiment for a client VM platform that includes a client packet monitor application.
Figure 3:
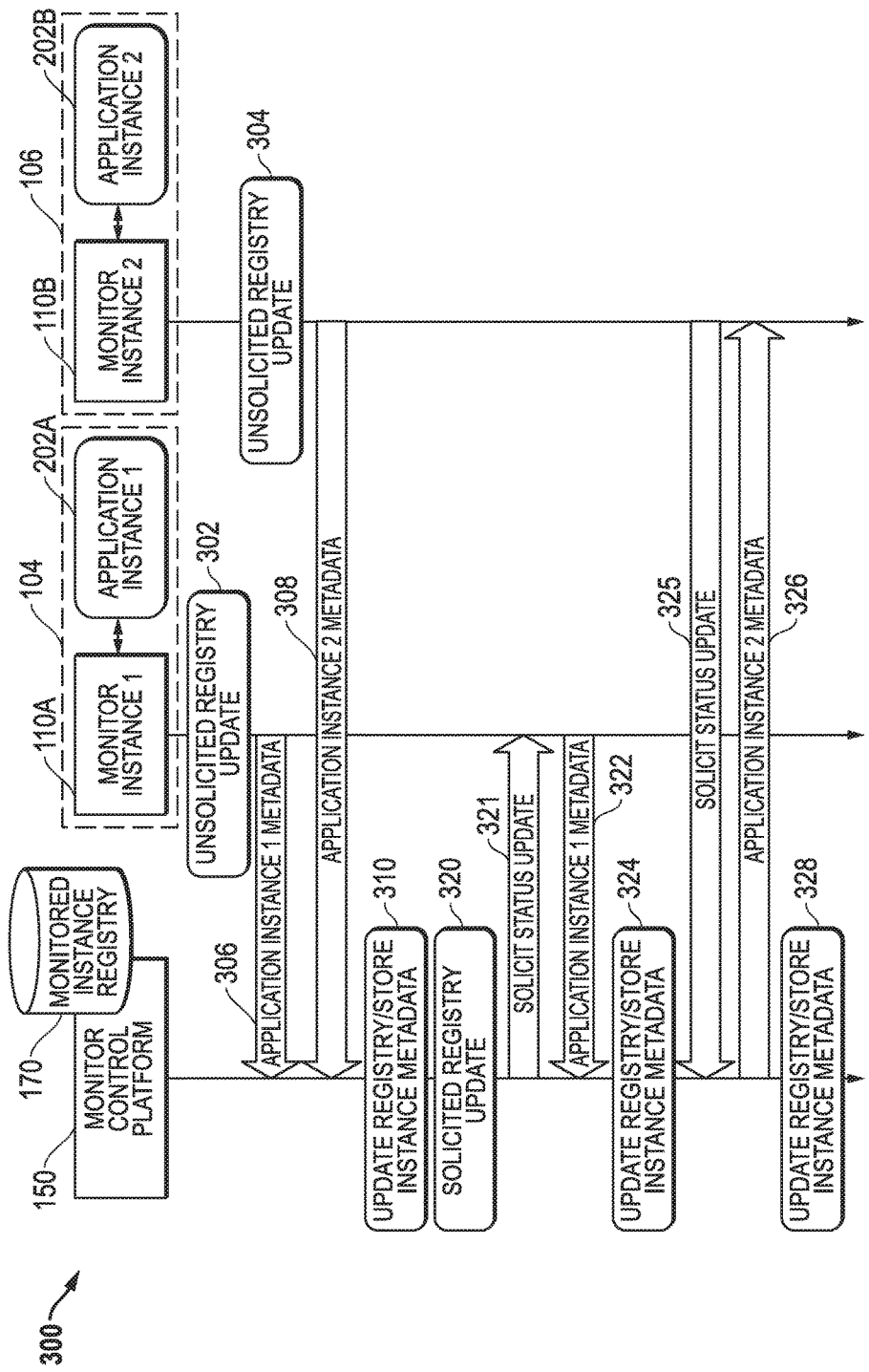
FIG. 3 is a swim lane diagram of an example embodiment for collection and storage of instance metadata from different application instances running as part of one or more VM platforms within a virtual processing environment.
Figure 4:
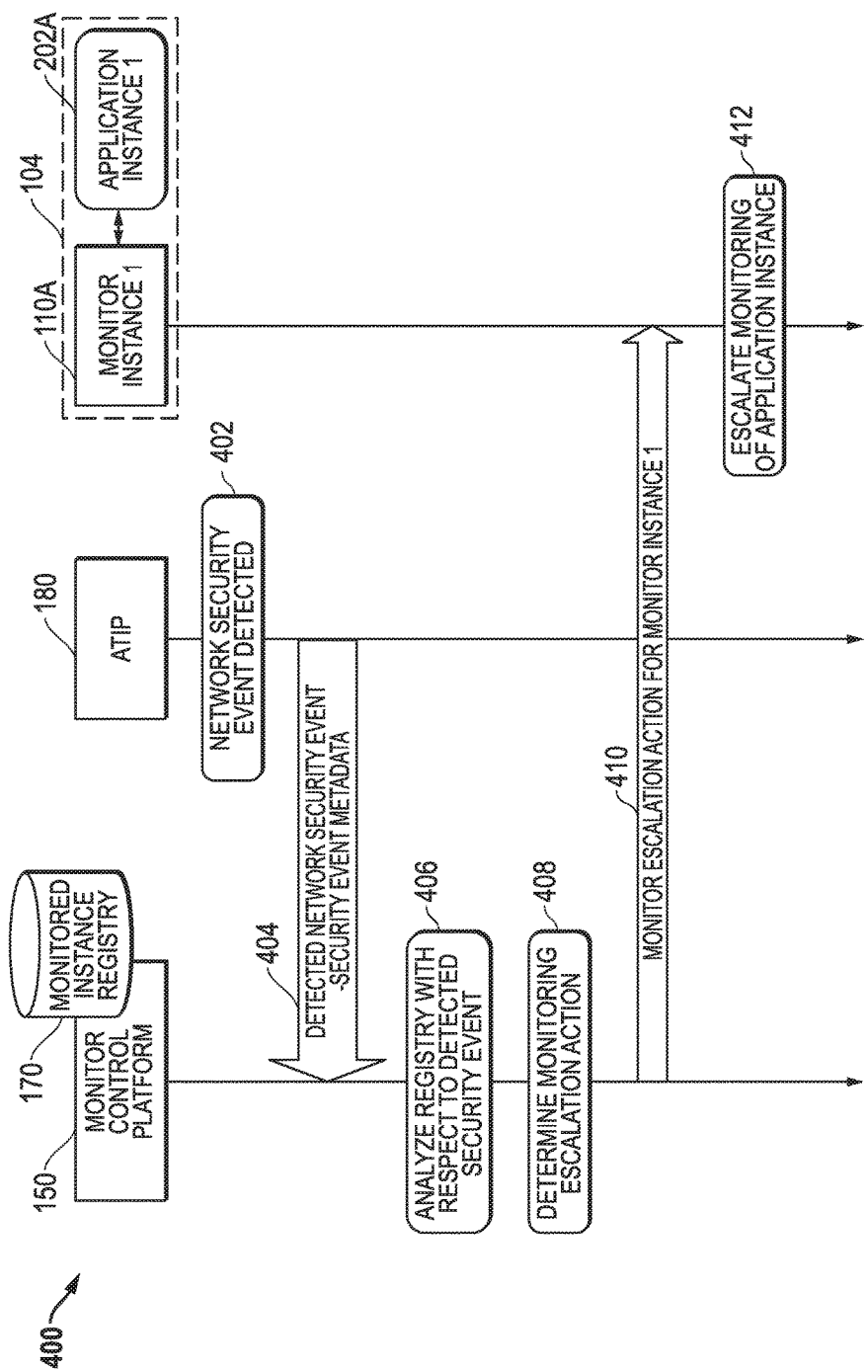
FIG. 4 is a swim lane diagram of an example embodiment for event based adjustments or escalations to monitoring provided by monitor instances based upon an analysis of metadata within the instance registry.
Figure 5:
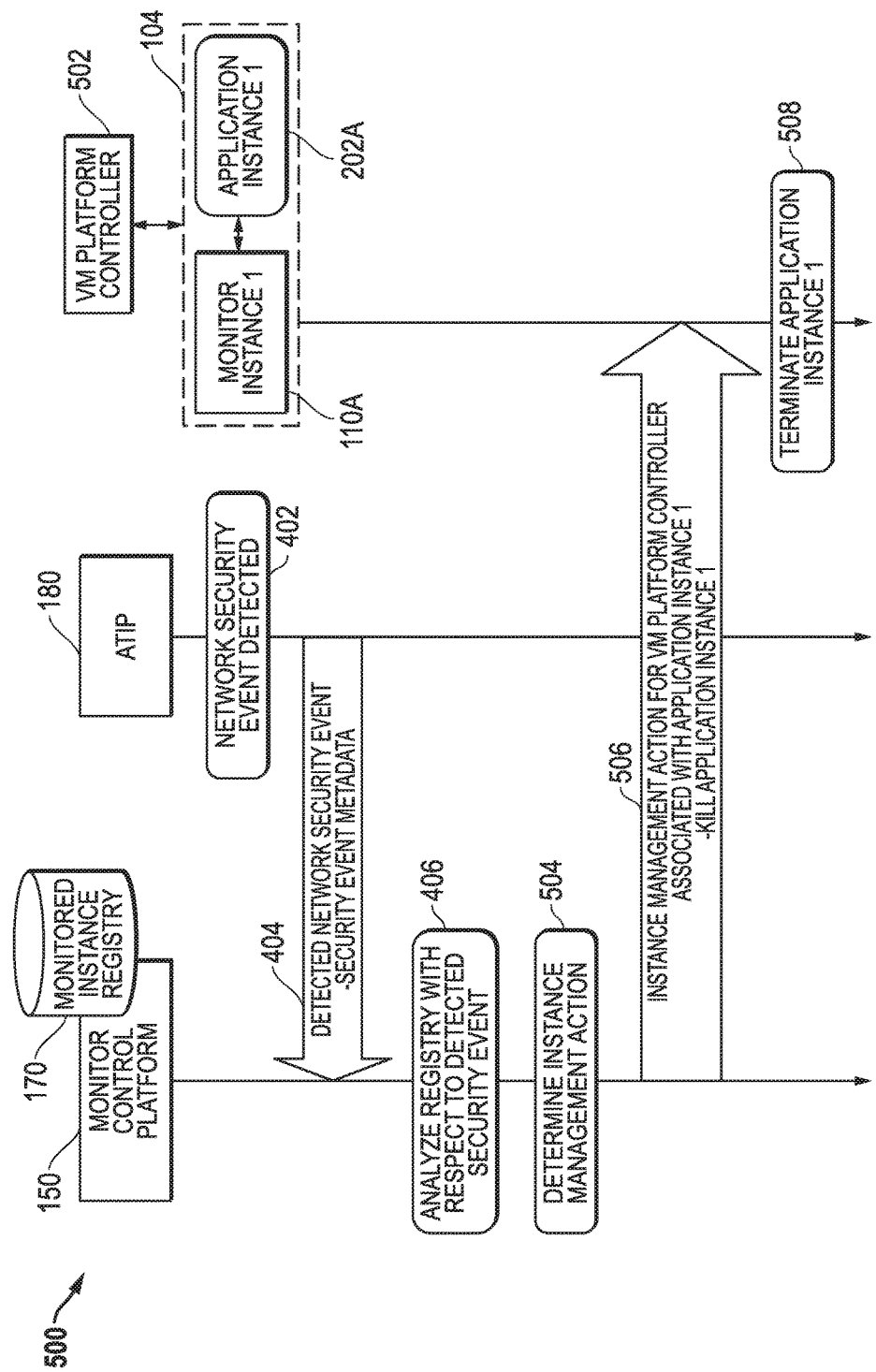
FIG. 5 is a swim lane diagram of an example embodiment for event-based management actions taken with respect to a monitored application instance based upon an analysis of metadata within the instance registry.
Figure 6:
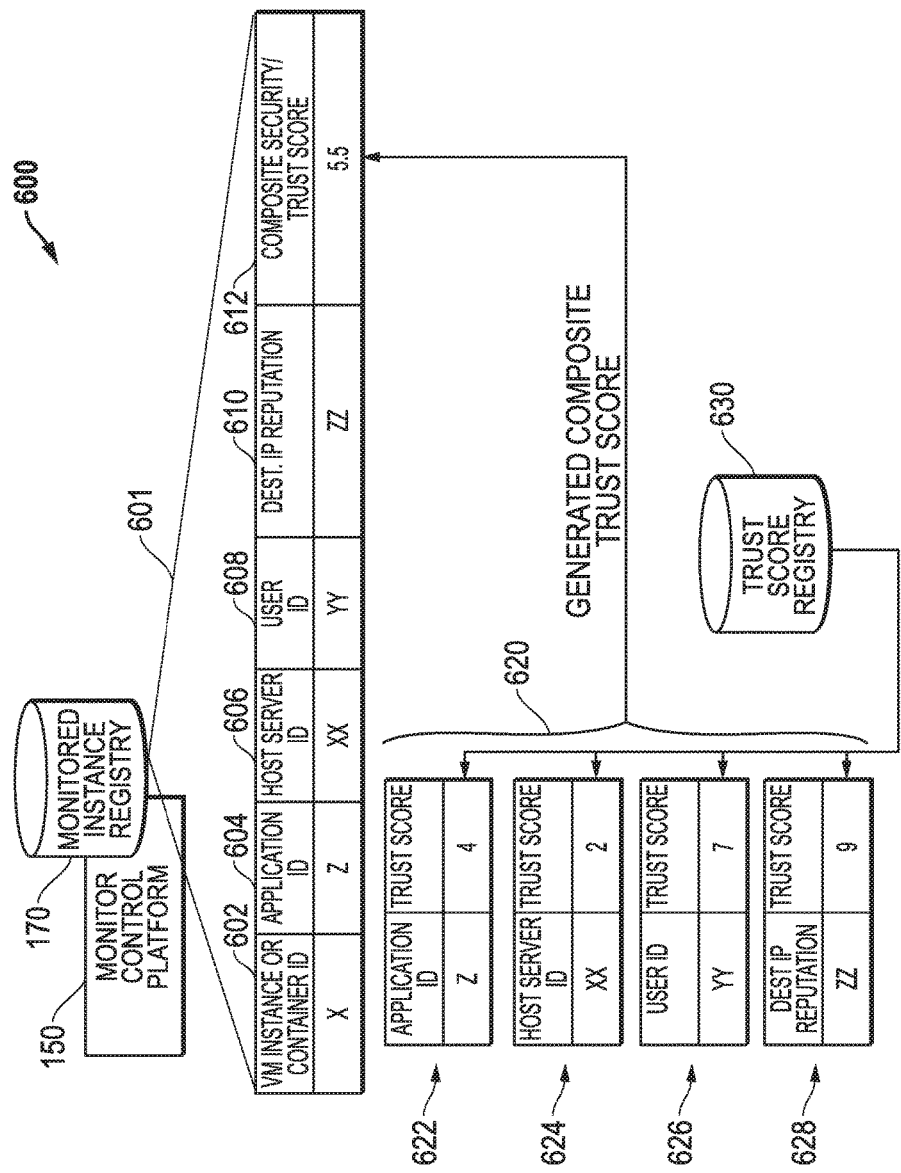
FIG. 6 is an example embodiment for trust scores that can be generated and used to identify one or more groups associated with the metadata stored in the instance registry.

Example embodiments are new described in more detail with respect to the drawings. FIGS. 1-2 provide example embodiments for virtual processing environments including VM host servers and VM platforms that are hosting monitored application instances and client monitor applications. FIG. 3 provides swim lane diagrams for unsolicited and/or solicited collection of metadata from monitored application instances using client monitor applications running within VM platforms that are hosting the application instances. FIGS. 4-5 provide swim lane diagrams for monitoring actions and/or management actions taken with respect to monitored application instances based upon security or threat events and associated analyses of metadata stored in the instance registry with respect to the monitored instance applications. FIG. 6 provides an example embodiment for determination of composite trust scores based upon the metadata, and these composite trust scores can be used to identify one or more groups of application instances and/or to trigger monitoring/management actions. FIGS. 7 and 8A-B provide example hardware/software environments. It is further noted that other variations and features can also be implemented while still taking advantage of the instance based management and control techniques described herein.

FIG. 1 is a block diagram of an example embodiment 100 for instance based management and control of virtual machine (VM) platforms in virtual processing environments. For the example embodiment 100, a monitor control platform 150 operates as VM platform on a VM host server 142, and the monitor control platform 150 monitors, manages, and controls client monitor applications 110 operating within VM platforms 104/106/108 and 124/126/128 on VM host servers 102 and 122. The client monitor applications 110 in turn operate to monitor, manage, and control one or more client application instances 202 that are operating within the VM platforms. For example, one or more client VM platforms 104, 106, 108 . . . operate within a VM host server 102, and a client monitor application 110 runs within each of the VM platforms 104, 106, 108 . . . and communicates with the monitor control VM platform 150 as indicated by dashed line 166. Similarly, one or more client VM platforms 124, 126, 128 . . . operate within a VM host server 122, and the client monitor application 110 also runs within each of the VM platforms 124, 126, 128 . . . and communicates with the monitor control VM platform 150 as indicated by dashed line 164. It is noted that the communications 164 and 166 can occur through the network communication paths 160 and/or through one or more other communication paths such as direct packet communications. The network communication paths 160 can include one or more wired network communication paths, wireless network communication paths, or a combination of wired and wireless communication paths. The network communication paths 160 can also include one or more intervening network communication devices or systems within a network communication infrastructure. Further, one or more different communication protocols can be used within the network communication paths 160 to communicate network packets through the network communication paths 160.

Looking to VM host server 102, the client VM platforms 104, 106, 108 . . . operate within a virtualization layer 112 that operates on top of an operating system (OS) 114 which in turn operates on computer hardware 116. The computer hardware 116 is coupled to communicate with the network communication paths 160, for example, through one or more network interface cards and/or other network connections. The client VM platforms 104, 106, 108 . . . can be configured, for example, to operate in part to host one or more client application instances or services that communicate packets through the network communication paths 160 and/or within the VM host server 102. As represented by client VM platform 104, each of the client VM platforms 104, 106, 108 . . . includes a client monitor application 110. As described herein, the client monitor application 110 communicates with the monitor control platform 150 and helps to monitor, manage, and control packet traffic and related operations within its particular client VM platform. The client monitor application 110 can also operate to forward copies of packet traffic to one or more network monitoring tools 180, which can be virtual and/or external monitoring devices connected to the network communication paths 160.

Looking to VM host server 122, the client VM platforms 124, 126, 128 . . . operate within a virtualization layer 132 that operates on top of an operating system (OS) 134 which in turn operates on computer hardware 136. The computer hardware 136 is coupled to communicate with the network communication paths 160, for example, through one or more network interface cards and/or other network connections. The client VM platforms 124, 126, 128 . . . can be configured, for example, to operate in part to host one or more client application instances 202 that communicate packets through the network communication paths 160 and/or within the VM host server 102. As represented by client VM platform 124, each of the client VM platforms 124, 126, 128 . . . includes a client monitor application 110. As described herein, the client monitor application 110 communicates with the monitor control platform 150 and helps to monitor, manage, and control packet traffic and related operations within its particular client VM platform. The client monitor application 110 can also operate to forward copies of this packet traffic to one or more network monitoring tools 180, which can be virtual and/or external monitoring devices connected to the network communication paths 160.

Looking to VM host server 142, the monitor control platform 150 operates within a virtualization layer 152 that operates on top of an operating system (OS) 154 which in turn operates on computer hardware 156. The computer hardware 156 is coupled to communicate with the network communication paths 160, for example, through one or more network interface cards and/or other network connections. The monitor control platform 150 can be configured, for example, to initialize, control, and/or otherwise manage the client monitor application(s) 110 through communications indicated by dashed lines 164 and 166. For example, the traffic management VM platform 150 can use one or more monitor configuration files 144 to initialize, configure, and/or otherwise manage the client monitor applications 110. As described herein, the monitor control platform 150 also receives and stores instance metadata 175 from the client monitor applications 110 that is collected by the client monitor applications 110 with respect to their respective VM platforms 104/106/108 and 124/126/128. While the monitor control platform 150 is shown as operating within a single VM host server 142, multiple monitor control platforms can be used and can also be distributed across a plurality of VM host servers. Further, the monitor control platform 150 can also be implemented as a stand-alone computing device rather than a VM platform operating within a VM host server 142. Other variations could also be implemented.

The instance metadata 175 stored within the registry 170 includes information about the VM platforms such as information about application instances running with the VM platforms, information about the VM platforms themselves, information about the underlying hardware, information about packets flows being handled by application instances being monitored, information about security levels, information about risk levels, and/or other information associated with the monitored instances or VM platforms. Further, as described herein, this instance metadata 175 within the registry 170 can be used to define one or groups 172 for which common management and/or control messages can be sent.

For some embodiments, common management and/or control messages are sent to defined groups of applications and VM platforms based upon one or more events, such as security threats and/or other network related events. For example, additional network monitoring tool(s) 180 can be connected to the network communication paths, can be monitoring network traffic associated with the VM platforms 104/106/108 and 124/126/128, and can communicate with the monitor control platform 150 as indicated by dashed line 182 to provide such security and/or network events. It is noted that the communications 182 can occur through the network communication paths 160 and/or through other communication paths.

It is noted that the configuration files 144 and the instance registry 170 can be stored within one or more data storage systems, and these data storage systems can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums. It is also noted that the VM host servers 102, 122, and 142 can be implemented using one or more programmable integrated circuits to provide the functionality described herein. For example, one or more processors (e.g., microprocessor, microcontroller, central processing unit, etc.), configurable logic devices (e.g., CPLD (complex programmable logic device), FPGA (field programmable gate array), etc.), and/or other programmable integrated circuit can be programmed with software or other programming instructions to implement the functionality described herein. It is further noted the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein for the VM host servers 102, 122, and 142 and their respective components.

In addition, installing tap functionality through the client packet monitor applications 110 within each of the client VM platforms 104, 106, 108 . . . has a number of advantages. For example, scaling is handled implicitly as the client packet monitor applications 110 will scale directly with the scaling of the client VM platforms. New client VM platform instances will include the client packet monitor application 110, and any reduction in the number of client VM platform instances will also remove any client packet monitor applications 110 running in those client VM platform instances. In addition, by being inside the client VM platform, the client packet monitor applications 110 are also behind any load balancer feeding packets to the client VM platforms thereby allowing for any prior load balancing to still be effective. Security is also improved and new risks are not introduced because packet security protections can remain unchanged as packets are obtained at the operating (OS) level and are obtained within a user's own network application context. Further, from inside the client VM platforms 104, 106, 108 . . . , the client packet monitor applications 110 have access to metadata that is outside the contents of the packet itself allowing for a broader basis for high-level forwarding configurations. For example, packet collection or filtering decisions can be made on the basis of operating system (OS), platform metadata, processing metrics (e.g., CPU load), and/or desired information apart from the packets contents themselves. Further examples of information outside the packet contents, which can be used to configure client/tool packet monitor applications and/or to generate filter configurations, include hardware architectures (e.g., number of processors, types of processors, numbers of network interfaces, types of network interfaces), hardware metrics (e.g., processor utilization, memory utilization), operating systems, hypervisor types, VM platform instance metadata (e.g., hostname, virtual operating system, kernel version, other software versions), processing environment information, client provided metadata, and/or other types of data not within the packets themselves. Other variations can also be implemented and other advantages may also be achieved while still taking advantage of the instance based management and control techniques described herein.

It is further noted that U.S. patent application Ser. No. 14/873,896, entitled "DIRECT NETWORK TRAFFIC MONITORING WITHIN VM PLATFORMS IN VIRTUAL PROCESSING ENVIRONMENTS" and filed Oct. 2, 2015, describes various embodiments including packet monitoring embodiments where client monitor applications are installed within VM platforms. This U.S. patent application Ser. No. 14/873,896 is hereby incorporated by reference in its entirety.

FIG. 2 is a block diagram of an example embodiment for a VM platform 104 that includes a client monitor application 110. The client monitor application 110 includes a network TAP 212, one or more filters 214, tool packet interface 220, and controller 216. The tool packet interface 220 also includes an encapsulation engine 222, and the controller 216 also includes configuration (CONFIG) data 218 and instance metadata 217. The client VM platform 104 in part operates to provide one or more client application instances 202 that generate and receive packets as client traffic 204 through a virtual network interface 206. The virtual network interface 206 in turn communicates VM platform traffic 208 with other VM platforms operating within the same VM host server and/or with external VM platforms or systems through the network communication paths 160. As described herein, this VM platform traffic 208 includes client traffic 204, tool traffic 226, management traffic 228 communicated with the monitor control platform 150, and any other traffic for the VM platform 104. Control messages 230 are also provided from the controller 216 to the client application instances 202 and are used to manage or control the operation of the client application instances 202 in certain circumstances as described further below. For example, the control messages 230 can be used to kill or stop execution of a client application instance 202, for example, when a security threat and/or some other event has been detected. Instance information 232 is also collected by the client monitor application 110 with respect to the one or more client application instances 202 operating within the VM platform 104, and this instance information 232 is stored as instance metadata 217 by the controller 216. The instance metadata 217 is then communicated to the monitor control platform 150 through solicited or unsolicited updates.

In operation, the client network TAP 212 for the client packet monitor application 110, which can be implemented as any desired virtual component that obtains copies of packets, obtains copies 224 of the client traffic 204 being communicated through the network interface 206. This copied client traffic 224 is then processed by one or more filters 214 to identify traffic of interest for one or more network analysis tools. This traffic of interest is sent to the tool packet interface 220 which uses the encapsulation engine 222 to add encapsulation headers to the traffic of interest. The resulting encapsulated tool traffic 226 is then provided back to the network interface 206 for communication out of the client VM platform 104 as part of the VM platform traffic 208. The tool traffic 226 is sent to and received by one or more network monitoring tools 180 operating with respect to the network communication system and/or by one or more other network destinations for the network communication system.

It is noted that the client packet monitor application 110 can also have a separate network interface, if desired, such that the tool traffic 226 and the management traffic 228 are communicated through this separate network interface rather than through the network interface 206. It is further noted that management traffic 228 received from the monitor control platform 150 can be configured to provide GRE identifiers for available tool applications and to provide filter configurations for the filters 214 that are subsequently applied to the received client traffic 224. Further, the client monitor application 110 can also communicate information and/or requests as management traffic 228 back to the monitor control platform 150, as desired. The configuration information received through the management traffic 228 by the client monitor application 110 can be stored as configuration data 218 by the controller 216, and the controller 216 can control the network TAP 212, the filters 214, and the tool packet interface 220 to operate according to these management instructions. Further, the client monitor application 110 can also manage or control the operation of the client application instances 202 through control messages 230 based upon management instructions received through the management traffic 228 within the VM platform traffic 208.

As indicated above, the controller 216 also collects instance information 232 associated with the client application instances 202. The controller 216 stores the instance information 232 as instance metadata 217 and reports the instance metadata 217 to the monitor control platform 150 through management traffic 228. As described below the instance metadata 217 can include a wide variety of information associated with the client application instances 202 including information about the client application instances 202 themselves, the VM platform 104, the underlying hardware and/or software environment within which the client applications are operating, and/or other information related to the monitored application instances 202 and/or VM platform 104. As described above, the monitor control platform 150 receives this instance metadata 217 from the client monitor application 110 and stores the instance metadata 217 in one or more data records as part of metadata 175 within the monitored instance registry 170 along with instance metadata received from other client monitor applications. Further as described herein, the instance metadata stored within the instance registry 170 can be searched and/or analyzed to identify one or more groups 172 of VM platforms and related application instances 202, and one or more different monitoring or management actions can be taken with respect to the groups 172.

FIG. 3 is a swim lane diagram of an example embodiment 300 for collection and storage of instance metadata from different application instances running as part of one or more VM platforms within a virtual processing environment. For embodiment 300, a monitor control platform 150 receives instance metadata from a first monitor instance 110A associated with a first application instance 202A operating within a first VM platform 104 and instance metadata from a second monitor instance 110B associated with a second application instance 202B operating within a second VM platform 106. The metadata from both application instances 202A/202B is stored in the monitored instance registry 170. For the embodiment 300, both unsolicited and solicited registry updates are shown.

For the unsolicited registry updates 302 and 304, the monitor instances 110A and 110B can be configured to periodically transmit instance metadata updates associated with their respective application instances 202A and 202B. For the unsolicited registry update 302 associated with monitor instance 110A, the monitor instance 110A sends metadata associated with the first application instance 202A through one or more messages 306 to the monitor control platform 150. For the unsolicited registry update 304 associated with monitor instance 110B, the monitor instance 110B sends metadata associated with the second application instance 202B through one or more messages 308 to the monitor control platform 150. The monitor control platform 150 receives the metadata messages 306/308 and updates one or more data records within the instance registry 170 associated with these application instances 202A/202B and related VM platforms 104/106.

For the solicited registry updates 320, the monitor control platform 150 sends a management message 321 to monitor instance 110A to solicit a status update for the metadata associated with the first application instance 202A. The monitor instance 110A responds by sending metadata updates associated with the first application instance 202A through one or more messages 322 to the monitor control platform 150. The monitor control platform 150 receives the metadata messages 322 and updates one or more data records within the instance registry 170 associated with the application instance 202A and related VM platform 104. Similarly, the monitor control platform 150 sends a management message 325 to monitor instance 110B to solicit a status update for the metadata associated with the second application instance 202B. The monitor instance 110B responds by sending metadata associated with the second application instance 202B through one or more messages 325 to the monitor control platform 150. The monitor control platform 150 receives the metadata messages 326 and updates one or more data records within the instance registry 170 associated with the application instance 202B and related VM platform 106.

In operation, therefore, the monitor applications or instances 110A/110B in part operate to collect metadata associated with application instances 202A/202B (e.g., Netflix application instances) that are being hosted in virtual processing environments. The monitor instances 110A/110B monitor packet traffic flows into and out of the application instances 202A/202B and can be configured to collect metadata associated with these packet traffic flows as well as metadata associated with the applications instances 202A/202B. This collected instance metadata can include a wide variety of information, such as IP (Internet Protocol) address information, port information, operating system (OS) information, OS versions, instance size, instance location, instance image versions, and/or other metadata associated with the operation of the application instances 202A/202B. This instance metadata including the packet flow metadata is communicated from the monitor instances 110A/110B to the monitor control platform 150, and the monitor control platform 150 stores the instance metadata within the monitored instance registry 170. As indicated above, metadata update communications can occur as unsolicited updates, for example through periodic update communications from the monitor instances 110A/110B, or as solicited updates, for example though update requests sent form the monitor control platform 150. Combinations of solicited and unsolicited updates can also be used. Variations can also be implemented while still taking advantage of the instance based management and control techniques described herein.

As described herein, the instance metadata in messages 306/322 from the monitor instance 110A and in messages 308/326 from the monitor instance 110B can include a wide variety of information associated with the operation of the application instances 202A and 202B, respectively. For one example embodiment described below with respect to TABLE 1, the metadata includes a process identifier (Process ID) related to a process being run by the application instances 202A/202B, an application identifier (App ID) associated with the application instances 202A/202B, and an agent identifier (AGENT ID) associated with the monitor instance 110A/110B. As described herein, other metadata associated with the packet traffic or traffic flows, the application instances 202A/202B, the VM platforms 104/106, and/or the monitor instances 110A/110B can also be collected, reported, and stored in the instance registry 170 as instance metadata 175.

TABLE 1 below provides an example for metadata that can be stored in data records within the monitored instance registry 170. The TIME column represents a collection timestamp associated with when the metadata was collected. The HOST ID column represents an identifier for the host hardware or server that is hosting the virtual processing environment for the VM platform. The VM ID column represents an identifier for the VM platform within which the application instances are running. The APP ID column represents an application identifier for the application instance running with the VM platform. The PROCESS ID column represents an identifier for a process being run by the application. The GROUPS column identifies one or more groups that have been assigned to or identified for the particular data record. The AGENT ID column identifies the monitor instance associated with the application instance operating with the VM platform. The VALID START and VALID END columns represent valid start and end times for the collected metadata. Different and/or additional metadata could also be collected and stored.

TABLE 1

EXAMPLE INSTANCE REGISTRY INCLUDING
DATA RECORDS STORING METADATA FOR MONITORED INSTANCES

| TIME | HOST ID | VM ID | APP ID | PROCESS ID | GROUPS | AGENT ID | VALID START | VALID END |
|---|---|---|---|---|---|---|---|---|
| TIME1 | HOST1 | VM1 | APP1 | PROC1 | GRP1 | AGENT1 | T1 | T3 |
| TIME1 | HOST1 | VM1 | APP1 | PROC2 | GRP1 | AGENT1 | T1 | T3 |
| TIME1 | HOST1 | VM1 | APP1 | PROC3 | GRP1 GRP2 | AGENT1 | T1 | T3 |
| TIME2 | HOST2 | VM1 | APP1 | PROC2 | GRP1 | AGENT2 | T2 | T3 |
| TIME2 | HOST2 | VM2 | APP2 | PROC3 | GRP2 | AGENT3 | T2 | T3 |
| ... | ... | ... | ... | ... | ... | ... | ... | ... |

Looking to TABLE 1 above, it is noted that two example groups have been identified for the example data within TABLE 1. A first group (GRP1) has been identified for any data record having the application identifier (APP ID) for a first application instance (APP1). As such, the first four data records are in GRP1 and include data collected at two points in time (TIME1, TIME2) for first virtual machines (VM1) operating in two different servers (HOST1, HOST2). A second group (GRP2) has been identified for any data record where a third process (PROC3) is running. As such, the third and fifth data records are in GRP2 and include data collected at two points in time (TIME1, TIME2) for first and second virtual machines (VM1, VM2) operating in two different servers (HOST1, HOST2). As described herein, the identification of groups can occur based upon a number of different factors including security and/or threat events generated by one or more monitoring systems for the network communication system within which applications instances are being monitored. Further, it is noted that the example data records provided in TABLE 1 are a simplified example and more detailed and complicated information can also be tracked within the instance registry 170, as desired, while still taking advantage of the instance based management and control techniques described herein.

FIG. 4 is a swim lane diagram of an example embodiment 400 for event based adjustments or escalations to monitoring provided by monitor instances 110 based upon an analysis of metadata within the instance registry 170. For the example embodiment 400, a monitoring system 180 such as an ATIP (application threat intelligence processor) is monitoring network traffic within a network communication system including an application instance 202A being monitored by the monitor instance 110A within a VM platform 104. The monitoring system 180 detects a network security event as represented by process block 402, and the monitoring system 180 sends messages 404 that provide security event metadata associated with the detected network security event. The monitor control platform 150 receives this security event metadata. In process block 406, the monitor control platform 150 then analyzes the instance metadata within the instance registry 170 with respect to the detected security event to identify one or more target records and/or one or more target groups of records that are relevant to the security event metadata. In process block 408, the monitor control platform 150 then determines one or more monitoring actions, such as a monitoring escalation, to apply to the records/groups identified from the registry analysis in process block 406. The monitor control platform 150 then sends messages 410 to one or more target monitor instances associated with a target group identified for the monitoring action. For the example embodiment 400, a monitoring escalation action is communicated within the messages 410 to a first monitor instance 110A, and the monitoring escalation action can includes instructions or commands for the monitor instance 110A to increase, change, and/or enhance its monitoring for the application instance 202A. As represented by process block 412, the monitor instance 110A escalates its monitoring of the network traffic and related operations for application instance 202A based upon the messages 410. The monitoring escalation can be, for example, monitoring additional packet traffic, forwarding additional packet traffic to a monitoring tool, collecting additional data associated with packet, and/or other escalated monitoring activities based upon the security event. Other monitoring actions and/or adjustments can also be implemented as part of this event related analysis of metadata within the instance registry 170. Further, other events in addition to or instead of security events can also be used to trigger searches and/or other analyses of the metadata within the instance registry 170 and related monitoring actions.

FIG. 5 is a swim lane diagram of an example embodiment 500 for event-based management actions taken with respect to a monitored application instance based upon an analysis of metadata within the instance registry 170. For the example embodiment, a monitoring system 180 such as an ATIP (application threat intelligence processor) is monitoring network traffic within a network communication system including an application instance 202A being monitored by the application monitor instance 110A. The monitoring systems 180 detects a network security event as represented by process block 402, and the monitoring system 180 sends messages 404 that provides security event metadata associated with the detected network security event. The monitor control platform 150 receives this security event metadata. In process block 406, the monitor control platform 150 analyzes the instance metadata within the instance registry 170 with respect to the detected security event to identify one or more target records and/or one or more target groups of records that are relevant to the security event metadata. In process block 504, the monitor control platform 150 then determines an instance management action, such as a terminate action, to apply to the records/groups identified from the registry analysis in process block 406. The monitor control platform 150 then sends messages 506 to one or more target monitor instances associated with a target record/group identified for the management action. For the example embodiment 500, a management action is communicated within the messages 506 to a first monitor instance 110A, and the management action is an action for the monitor instance 110A to instruct a VM platform controller 502 associated with the first application instance 202A to terminate or kill that application instance 202A. As represented by process block 508, the application instance 202A is terminated. It is also noted that other events in addition to or instead of security events can also be used to trigger searches and/or other analyses of the metadata within the instance registry 170. Further, as part of this event related analysis of metadata within the instance registry 170, management actions other than terminate/kill actions can also be selected and communicated to the monitor instance 110A and, in appropriate circumstances, from the monitor instance 110A to a VM platform controller 502. For example, allocations of one or more resources could be increased or decreased for the applications instance 220A based upon a network event.

In operation, therefore, security and/or other network events can be used to trigger searches or analyses of the metadata stored within the instance registry 170, and one or more monitoring/management actions can be taken based upon the results of the searches/analyses. As described above, the searches/analyses can result in the identification of one or more groups of data records within the instance registry 170 for application instances being monitored within the virtual processing environment. Once identified, the monitoring/management actions can be communicated to the monitor instances associated with the identified application instances. The monitor instances can then cause the monitoring/management action to be implemented with respect to the identified application instances.

As also indicated above, different events or network conditions can be used to trigger a monitoring/management action. One event or network condition can be associated with a security risk level or assessment for VM platforms, application instances, and/or related systems operating with a network communication system. As described with respect to FIG. 6, trust scores can be used to identify one or more groups of application instances and to provide event or network condition upon which monitoring/management actions can be taken.

FIG. 6 is an example embodiment 600 for trust scores that can be generated and used to identify one or more groups associated with the metadata stored in the instance registry 170. In addition, the trust score information can be stored as part of the data records within the instance registry 170. For the example embodiment 600, the metadata stored for the application instances within the instance registry 170 includes a VM platform instance or container identifier (VM ID) 602, an application instance identifier (App ID) 604, a host server identifier (Server ID) 606, a user identifier (User ID) 608, and a reputation value 610 for the destination IP address (Dest IP) associated with a network function or service with which the application instance is communicating. For the example embodiment depicted, "x" is stored for the VM platform instance or container identifier (VM ID) 602, "z" is stored for the application instance identifier (App ID) 604, "xx" is stored for a host server identifier (Server ID) 606, "yy" is stored for a user identifier (User ID) 608, and "zz" is stored for destination IP reputation (Dest IP) value 610.

A trust score can be assigned or allocated to one or more of these metadata items, and the trust scores associated with one or more of these metadata items is then used to generate a composite security or trust score 612 for the data record stored within the instance registry 170. This composite trust score 612 can generated by the monitor control platform 150 and can then be stored along with the other metadata for data records within the instance registry 170. Further, individual trust scores can be obtained from a trust score registry 630 that is also managed by the monitor control application 150. The trust score registry can include trust scores associated with different identifiers that have known risk profiles with respect the network communication system within which the application instances are operating. For example, certain website destinations, applications, processes, users, and/or other network related functions may be known is riskier or less risky functions and can be allocated or assigned trust scores representing that risk assessment. Trust scores can then be associated with identifiers for these known network functions within the trust score registry 630.

For the example embodiment 600, four individual trust scores 620 are used to generate a composite trust score 612. In particular, a trust score of a level of 4 is allocated to the application ID having the "z" identifier as indicated by the arrow 622. A trust score of a level of 2 is allocated to the host server ID having the "xx" identifier as indicated by the arrow 624. A trust score of a level of 7 is allocated to the user ID having the "yy" identifier as indicated by the arrow 626. A trust score of a level of 9 is allocated to the destination IP address having the "zz" identifier as indicated by the arrow 628. As indicated above for some embodiments, a trust score registry 630 may be maintained that associates trust scores with identifiers, and the trust scores for items 622/624/626/628 can be obtained from the trust score registry 630. The example composite trust score 620 for embodiment 600 relies upon these four individual trust scores. For example, a simple average of the individual trust scores (TS) can be used to set the composite trust score (COMP TS) according to the following algorithm:

COMP TS=AV[TS(App ID)+TS(Server ID)+TS(User ID)+TS(Dest IP)]

For the example embodiment 600 and using this average algorithm for determination of the composite trust score 620, the composite trust score 620 would be 5.5 (i.e., AVG(4+2+7+9)=5.5). For another example embodiment, the composite trust score can be set to the highest of the individual trust scores where higher scores indicate greater risk or to the lowest of the individual trust scores where lower scores indicate greater risk. For this further embodiment, it is assumed that the security risk for the network function associated with the metadata for the data record with the instance registry should be based upon the most risky or least secure component. It is also noted that additional and/or different algorithms or combinations of algorithms could also be used for the composite trust score determination. It is further noted that different and/or additional trust scores can also be used for the generation of the composite trust score while still taking advantage of the trust score generation techniques described herein.

Composite trust scores can be generated for one or more of the records within the instance registry 170. The composite trust scores and/or the individual trust scores can then be used to identify one or more groups of records and associated application instances and application monitor applications. As described above, the identified groups can further be used to send monitoring actions, management actions, and/or other desired actions to the monitor instances within these identified groups, and these actions are then applied by the monitor instances to the associated application instances that are operating in one or more VM platforms within the virtual processing environment.

TABLE 2 below provides an example for individual and composite trust scores stored for data records within the monitored instance registry 170. The HOST ID column represents an identifier for the host hardware or server that is hosting the virtual processing environment for the VM platform. The VM ID column represents an identifier for the VM platform within which the application instances are running. The APP ID column represents the application identifier for the application instance running with the VM platform. The PROCESS ID column represents an identifier for a process being run by the application. The USER ID column represents an identifier for the user of the application/process. The destination IP reputation represents a security rating for the destination end point for the packet flow relating to the application/process. The COMP TRUST SCORE represents the composite trust score generated for the different records. The GROUPS column identifies one or more groups that have been assigned to or identified for the particular data record. It is noted that the "TS-x" identifiers represent the individual trust scores stored for the metadata items with the "x" representing the particular trust score. It is also noted that different and/or additional metadata and related trust scores could also be collected and stored within the instance registry as well as related trust score information.

the second group (GRP2). In addition, a third group (GRP3) has been identified for any data record having an single trust score of greater than or equal to 8. As such, three data records are in the third group (GRP3). As described herein, therefore, the identification of groups can occur based upon one or more individual trust numbers, based upon the composite trust scores, or based upon a combination of individual trust scores and composite trust scores. Further, it is noted that the example data records provided in TABLE 2 is a simplified example and more detailed and complicated information can also be tracked for individual or composite trust scores, as desired, while still taking advantage of the trust score generation techniques described herein.

It is noted that the trust scores can be assigned or allocated to individual metadata items based upon various network related information. For example, riskier activities identified through particular processes, applications, destinations, or other metadata can be given higher trust scores, and less risky activities can be giving lower trust scores, again assuming that a higher number indicated higher risk. In addition, as indicated above, trust scores for known network functions can be collected and stored within a trust score registry 630. The trust scores stored within the trust registry 630 can be manually set by a system manager, can be automatically set through security updates provided by one or more network monitoring tools (e.g., application threat intelligence processor, intrusion detection system, or other network monitoring tool). These individual or component level trust scores can also take into consideration other entities or functions that are connected to or communicate with the particular item being scored. Other variations and techniques could also be implemented to collect, generate, and store trust scores for the trust score registry 630 and/or for the metadata items stored within the data records for the monitored instance registry 170.

FIG. 7 is a block diagram of an example embodiment for a VM host server 102/122/142. For the example embodiment depicted, the VM host server 102/122/142 includes one or more processors 702 or other programmable integrated circuits to provide a virtualization layer 112/132/152 includ-

TABLE 2

EXAMPLE INSTANCE REGISTRY INCLUDING
DATA RECORDS STORING METADATA FOR MONITORED INSTANCES

| HOST ID | VM ID | APP ID | PROCESS ID | USER ID | DEST IP REP | COMP TRUST SCORE | GROUPS |
|---|---|---|---|---|---|---|---|
| HOST1 (TS-3) | VM1 (TS-3) | APP1 (TS-5) | PROC1 (TS-4) | USER1 (TS-2) | REP1 (TS-5) | 3.7 | GRP1 |
| HOST1 (TS-3) | VM1 (TS-3) | APP1 (TS-5) | PROC2 (TS-8) | USER1 (TS-2) | REP2 (TS-8) | 4.8 | GRP2 GRP3 |
| HOST1 (TS-3) | VM1 (TS-3) | APP1 (TS-5) | PROC3 (TS-1) | USER1 (TS-2) | REP3 (TS-6) | 3.3 | GRP1 |
| HOST2 (TS-4) | VM1 (TS-2) | APP1 (TS-5) | PROC2 (TS-8) | USER2 (TS-4) | REP2 (TS-8) | 5.2 | GRP2 GRP3 |
| HOST2 (TS-2) | VM2 (TS-1) | APP2 (TS-3) | PROC3 (TS-1) | USER2 (TS-4) | REP4 (TS-8) | 3.2 | GRP1 GRP3 |
| . . . | . . . | . . . | . . . | . . . | . . . | . . . | . . . |

Looking to TABLE 2 above, it is noted that three example groups have been identified for the example data within TABLE 2 based upon the composite trust scores. A first group (GRP1) has been identified for any data record having a composite trust score less than or equal to 4.0, and a second group (GRP2) has been identified for any data record having a composite trust score greater than 4.0. As such, three records are in the first group (GRP1), and two records are in ing a plurality of virtual machine (VM) platforms 712, 714, . . . 716 that run one or more applications as described herein. The VM host server 102/122/142 also includes one or more network interface cards (NICs) 704, one or more input/output (I/O) ports 706, one or more data storage systems 708, and one or more memory devices 703 coupled to communicate with each other through a system bus interconnect 710. In operation, virtualization layer 112/132/

152 and the VM platforms (VM1, VM2 ... VM(N)) 712, 714, ... 716 run on top of a VM host operating system (OS) 114/134/154. For example, the VM host operating system 114/134/154, the virtualization layer 112/132/152, and the VM platforms 712, 714, ... 716 can be initialized, controlled, and operated by the processors or programmable integrated circuits 702 which load and execute software code and/or programming instructions stored in the data storage systems 708 to perform the functions described herein. The VM platforms 712, 714, ... 716 can be the VM platforms and/or the monitor control platform described above.

The memory 703 can include one or more memory devices that store program instructions and/or data used for operation of the VM host server 102/122/142. For example, during operation, one or more of the processor(s) 702 can load software or program instructions stored in the data storage systems 708 into the memory 703 and then execute the software or program instructions to perform the operations and functions described herein. In addition, for operation, one or more of the processors 702 or other programmable integrated circuit(s) can also be programmed with code or logic instructions stored in the data storage systems 708 to perform the operations and functions described herein. It is noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the instance based management and control techniques described herein.

The virtualization layer 112/132/152 for the VM platforms described herein can be implemented using any desired virtualization layer, such as using a hypervisor or a container engine, that provides a virtual processing environment for the VM platforms. Using a hypervisor, as shown in FIG. 8A below, the client monitor application 110 operates in addition to an application 802/812 on a guest operating system 806/816 within one of the VM platforms 712/714 which in turn run on top of the hypervisor as the virtualization layer 112/132/152. Using a container engine, as shown in FIG. 8B below, the client monitor application 110 operates along with applications 802/812 within a VM platform 712 that operates on top of the container engine as the virtualization layer 112/132/152. As depicted in FIG. 8B, the VM platform 712 for this embodiment operates as a virtual computing platform without the emulated hardware (HW) 808 and without the guest operating system (OS) 806 that are shown with respect to the embodiment of FIG. 8A. In this container engine embodiment, the applications 802/812 as well as the client monitor application 110 are containers or other software components within a single VM platform 712. This container engine embodiment of FIG. 8B thereby provides a more streamlined technique that adds the client monitor application 110 to a VM platform as the containers are relatively isolated from each other. For one embodiment, the container engine can be implemented as a DOCKER container for a Linux operating system configured to execute DOCKER containers, which are software components that are designed to be compatible with a Linux-based DOCKER container engine. Other variations could also be implemented.

Looking now in more detail to FIG. 8A, a diagram is provide of an example embodiment 800 for a VM host server 102/122/132 that uses a hypervisor to provide a virtualization layer 112/132/152. For the embodiment 800, VM platforms 712 and 714 operate on top of hypervisor 112/132/152 which in turn operates on top of host operating system (OS) 114/134/154 which in turn operates on top of server hardware 116/136/156. For this embodiment 800, the VM host server 102/122/142 provides emulated hardware (HW) resources 808 and a guest operating system (OS) 806 for VM platform 712, and VM platform 712 executes binary code (BINS) or libraries (LIBS) 804 on top of the guest operating system 806 to provide a first application (APP A) 802. Similarly, the VM host server 102/122/142 provides emulated hardware (HW) resources 818 and a guest operating system (OS) 816 for VM platform 714, and VM platform 714 executes binary code (BINS) or libraries (LIBS) 814 on top of guest operating system 816 to provide a second application (APP B) 812. Thus, each of the VM platforms 712 and 714 have separate emulated hardware resources 808/818 and guest operating systems 806/816. For embodiment 800 as indicated above, a client monitor application 110 when installed can operate within one of the VM platforms 712/714 on top of the guest OS 806/816 along with one of the application 802/812.

FIG. 8B is a block diagram of an example embodiment 850 for a VM host server 102/122/132 that uses a container engine to provide a virtualization layer 112/132/152. For the embodiment 850, VM platform 712 operates on top of container engine 112/132/152 which in turn operates on top of host operating system (OS) 114/134/154 which in turn operates on top of server hardware 116/136/156. For this embodiment 850, however, the VM platform 712 executes binary code (BINS) or libraries (LIBS) 804 directly on top of the container engine 112/132/152 to provide a first application (APP A) 802 and executes binary code (BINS) or libraries (LIBS) 814 directly on top of the container engine 112/132/152 to provide a second application (APP B) 812. As such, the container engine 112/132/152 provides a direct interface to the host operating system 114/134/154 without need for emulated hardware (HW) resources 808/818 and/or guest operating systems 806/816 as used in FIG. 8A. For embodiment 850 as indicated above, a client monitor application 110 when installed can operate along with the other applications 802/812 on top of the container engine 112/132/152 within the VM platform 712.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the instance based management and control techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to control packet traffic monitoring, comprising:
    receiving and transmitting network packets with a plurality of virtual machine (VM) platforms operating within one or more VM host servers;
    at each of the plurality of VM platforms within the one or more VM host servers:
        operating one or more client application instances within the VM platform;
        operating a monitor application within the VM platform;
        monitoring, with the monitor application, network packets associated with network packet traffic for the one or more client application instances;
        determining, with the monitor application, metadata associated with the operation of the one or more client application instances; and
        transmitting, with the monitor application, the metadata to a control server;
    at the control server:
        receiving metadata from each monitor application within each of the plurality of VM platforms;
        storing the metadata in records within an instance registry, the instance metadata registry being stored within one or more data storage systems;
        generating at least one message based upon one or more records within the instance registry, the message indicating one or more actions for at least one target monitor application within at least one target VM platform; and
        transmitting the at least one message to the at least one target monitor application within the at least one target VM platform; and
    at the at least one target VM platform:
        implementing, with the at least one target monitor application, the one or more actions indicated by the message.

2. The method of claim 1, further comprising, at the control server, receiving one or more event messages from an external network monitoring tool, searching the instance registry based upon the one or more event messages, and generating the at least one message based upon the results of the searching.

3. The method of claim 1, further comprising identifying a plurality of groups based upon the metadata stored within the instance registry.

4. The method of claim 3, wherein the at least one message is targeted to one or more of the plurality of groups.

5. The method of claim 1, further comprising, at the control server, allocating one or more individual trust scores to a plurality of individual components within the records within the instance registry and generating a composite trust score for each record based upon the individual trust scores.

6. The method of claim 5, further comprising identifying a plurality of groups based upon the composite trust scores.

7. The method of claim 6, wherein the at least one message is targeted to one or more of the plurality of groups.

8. The method of claim 5, further comprising generating the composite trust score based upon a function of two or more of the individual trust scores.

9. The method of claim 1, wherein the metadata for each client application instance comprises at least one of an identifier associated with the VM platform, an application identifier associated with the client application instance, or a process identifier (ID) associated a process being run by the client application instance.

10. The method of claim 1, wherein the one or more actions comprise enhanced monitoring of network packet traffic for the at least one target client application instance within the at least one target VM platform.

11. The method of claim 1, wherein the one or more actions comprise termination of the at least one target client application instance within the at least one target VM platform.

12. The method of claim 1, further comprising, with the monitor application within each of the plurality of VM platforms, automatically sending metadata updates to the control server.

13. The method of claim 1, further comprising, with the monitor application within each of the plurality of VM platforms, sending metadata updates to the control server based upon an update message received from the control server.

14. The method of claim 1, wherein each of the VM platforms operates on a virtualization layer within the one or more VM host servers, the virtualization layer comprising at least one of a hypervisor or a container engine running within the one or more VM host servers.

15. A system for packet traffic monitoring and control, comprising:
one or more virtual machine (VM) host servers including one or more programmable integrated circuits programmed to host a plurality of VM platforms, each VM platform configured to run:
one or more client application instances to send and receive network packet traffic; and
a monitor application to monitor network packets associated with the network packet traffic for the one or more client application instances, to determine metadata associated with the operation of the one or more client application instances, and to transmit the metadata to a control server; and
the control server including one or more programmable integrated circuits programmed to:
receive the metadata from each monitor application within each of the plurality of VM platforms;
store the metadata in records within an instance registry, the instance metadata registry being stored within one or more data storage systems;
generate at least one message based upon one or more records within the instance registry, the message indicating one or more actions for at least one target monitor application within at least one target VM platform; and
transmit the at least one message to the at least one target monitor application within the at least one target VM platform;
wherein the at least one target monitor application is further configured to implement the one or more actions indicated by the message.

16. The system of claim 15, wherein the control server is further configured to receive one or more event messages from an external network monitoring tool, to search the instance registry based upon the one or more event messages, and to generate the one or more messages based upon the results of the searching.

17. The system of claim 15, further wherein the control server is further configured to identify a plurality of groups based upon the metadata stored within the instance registry.

18. The system of claim 17, wherein the at least one message is targeted to one or more of the plurality of groups.

19. The system of claim 15, wherein the control server is further configured to allocate one or more individual trust scores to a plurality of individual components within the records within the instance registry and to generate a composite trust score for each record based upon the individual trust scores.

20. The system of claim 19, wherein the control server is further configured to identify a plurality of groups based upon the composite trust scores.

21. The system of claim 20, wherein the at least one message is targeted to one or more of the plurality of groups.

22. The system of claim 19, wherein the control server is further configured to generate the composite trust score based upon a function of two or more of the individual trust scores.

23. The system of claim 15, wherein the metadata for each client application instance comprises at least one of an identifier associated with the VM platform, an application identifier associated with the client application instance, or a process identifier (ID) associated a process being run by the client application instance.

24. The system of claim 15, wherein the one or more actions comprise enhanced monitoring of network packet traffic for at least one target client application instance within the at least one target VM platform.

25. The system of claim 15, wherein the one or more actions comprise termination of the at least one target client application instance within the at least one target VM platform.

26. The system of claim 15, wherein the monitor application within each of the plurality of VM platforms is further configured to automatically send metadata updates to the control server.

27. The system of claim 15, wherein the monitor application within each of the plurality of VM platforms is further configured to send metadata updates to the control server based upon an update message received from the control server.

28. The system of claim 15, wherein each of the VM platforms operates on a virtualization layer within the one or more VM host servers, the virtualization layer comprising at least one of a hypervisor or a container engine running within the one or more VM host servers.

\* \* \* \* \*